No. 780,806. PATENTED JAN. 24, 1905.
J. B. MOSCROP, DEC'D.
C. MOSCROP, W. HEALD & A. P. OKELL, EXECUTORS.
MACHINE FOR TESTING AND RECORDING THE STRENGTH OF YARN OR THREAD.
APPLICATION FILED NOV. 27, 1903.

No. 780,806. PATENTED JAN. 24, 1905.
J. B. MOSCROP, DEC'D.
C. MOSCROP, W. HEALD & A. P. OKELL, EXECUTORS.
MACHINE FOR TESTING AND RECORDING THE STRENGTH OF YARN OR THREAD.
APPLICATION FILED NOV. 27, 1903.

Inventor
John B. Moscrop.
DECEASED.
Caroline Moscrop.
William Heald.
Arthur Percival O. Kell.
EXECUTORS.

No. 780,806. PATENTED JAN. 24, 1905.
J. B. MOSCROP, DEC'D.
C. MOSCROP, W. HEALD & A. P. OKELL, EXECUTORS.
MACHINE FOR TESTING AND RECORDING THE STRENGTH OF YARN OR THREAD.
APPLICATION FILED NOV. 27, 1903.

No. 780,806. PATENTED JAN. 24, 1905.
J. B. MOSCROP, DEC'D.
C. MOSCROP, W. HEALD & A. P. OKELL, EXECUTORS.
MACHINE FOR TESTING AND RECORDING THE STRENGTH OF YARN OR THREAD.
APPLICATION FILED NOV. 27, 1903.
11 SHEETS—SHEET 9.

No. 780,806. PATENTED JAN. 24, 1905.
J. B. MOSCROP, DEC'D.
C. MOSCROP, W. HEALD & A. P. OKELL, EXECUTORS.
MACHINE FOR TESTING AND RECORDING THE STRENGTH OF YARN OR THREAD.
APPLICATION FILED NOV. 27, 1903.
11 SHEETS—SHEET 10.

No. 780,806. PATENTED JAN. 24, 1905.
J. B. MOSCROP, DEC'D.
C. MOSCROP, W. HEALD & A. P. OKELL, EXECUTORS.
MACHINE FOR TESTING AND RECORDING THE STRENGTH OF YARN OR THREAD.
APPLICATION FILED NOV. 27, 1903.
11 SHEETS—SHEET 11.

Attest:
C. S. Middleton
Edward Saxton

Inventor
John B. Moscrop.
DECEASED
Caroline Moscrop.
William Heald.
Arthur Percival Okell.
EXECUTORS by Munn Spear Company Attys.

No. 780,806. Patented January 24, 1905.

UNITED STATES PATENT OFFICE.

CAROLINE MOSCROP AND WILLIAM HEALD, OF MANCHESTER, AND ARTHUR PERCIVAL OKELL, OF BOWDON, ENGLAND, EXECUTORS OF JOHN BROWN MOSCROP, DECEASED.

MACHINE FOR TESTING AND RECORDING THE STRENGTH OF YARN OR THREAD.

SPECIFICATION forming part of Letters Patent No. 780,806, dated January 24, 1905.

Application filed November 27, 1903. Serial No. 182,905.

*To all whom it may concern:*

Be it known that JOHN BROWN MOSCROP, who was a subject of the King of Great Britain and Ireland, and a resident of 25 Market Place, Manchester, in the county of Lancaster, England, but is now deceased, did invent certain new and useful Improvements in Testing and Recording the Strength of Yarn or Thread, (for which applications have been made for Letters Patent in Great Britain, No. 26,801, and bearing date December 4, 1902, and in Germany, application filed October 14, 1903,) of which the following is a specification.

This invention relates to a machine for testing the strength of yarn and thread and automatically recording the results of the tests.

Hereinafter in the specification and claims the word "yarn" is used to mean either yarn or thread.

Heretofore yarn has been tested for strength by taking a large number of pieces and collectively stressing them till they break. The average strength of the pieces is thus obtained, and this can be recorded by hand. This method of testing yarn has two objections. In the first place, only the average strength is obtained. The number of weak places in the yarn is not disclosed. Now a manufacturer wants to know not so much the average strength as the number of weak places and their degree of weakness. In the second place, no record of strength is made automatically. The correctness and accuracy of the record are therefore dependent on the intelligence, care, attention, and honesty of the operative.

The machine forming the subject-matter of this application for patent is entirely new, and it enables the strength of individual pieces of yarn to be ascertained and automatically recorded.

The machine and its working can be briefly described as follows: A piece of yarn is caught between two grips, one of which will be called the "fixed" grip and the other the "moving" grip. The "fixed" grip is so called because it is carried by the frame of the machine, while the moving grip is carried by a traveling carriage. The fixed grip is really not quite stationary. It has a small movement when tension is put on the yarn. The yarn is caught between the moving grip and the fixed grip and the carriage is moved so that the grips are separated. The yarn is thus stretched between the two grips and tension put on it. The moving grip continuing its motion, the fixed grip is pulled from its normal position by the tension of the yarn and against the action of a spring. The force which this spring exerts on the fixed grip to pull it back is proportional to or at least dependent on the amount of elongation or deflection of the spring. As the moving grip continues its motion a tension is at length put on the yarn greater than it can stand and the yarn breaks. At the instant of breaking the distance of the fixed grip from its normal position will be an indication of the tension which has been put on the yarn. As soon as the yarn breaks the fixed grip is returned to its normal position by the before-mentioned spring. Means are provided for recording on a sheet or strip of paper the greatest displacement of the fixed grip from its normal position—that is, the displacement when the yarn breaks. A record is thus made of the strength of the yarn. The moving grip now approaches the fixed grip again, and the fixed grip and moving grip again take hold of another length of yarn from the same cop or spool. This length is tested in the same way, and the machine continues to test the cop or spool of yarn length by length until the whole cop or spool has been broken up or until the machine is stopped. Means are provided for moving the paper, so that the record of each break is kept distinct from the preceding one. Mechanism is provided for removing the loose ends of yarn, for closing and opening the fixed and moving grips, and for other necessary operations. As a rule, more than one length of yarn will be tested at a time—that is to say, there will be a number of cops or spools placed in the machine and a corresponding number of pairs of grips, all of which will act at the same time.

Referring now to the accompanying drawings, which illustrate a testing and recording machine constructed in one convenient form according to this invention and in which the record is made by needles which prick holes in a band of paper.

Figure 1:
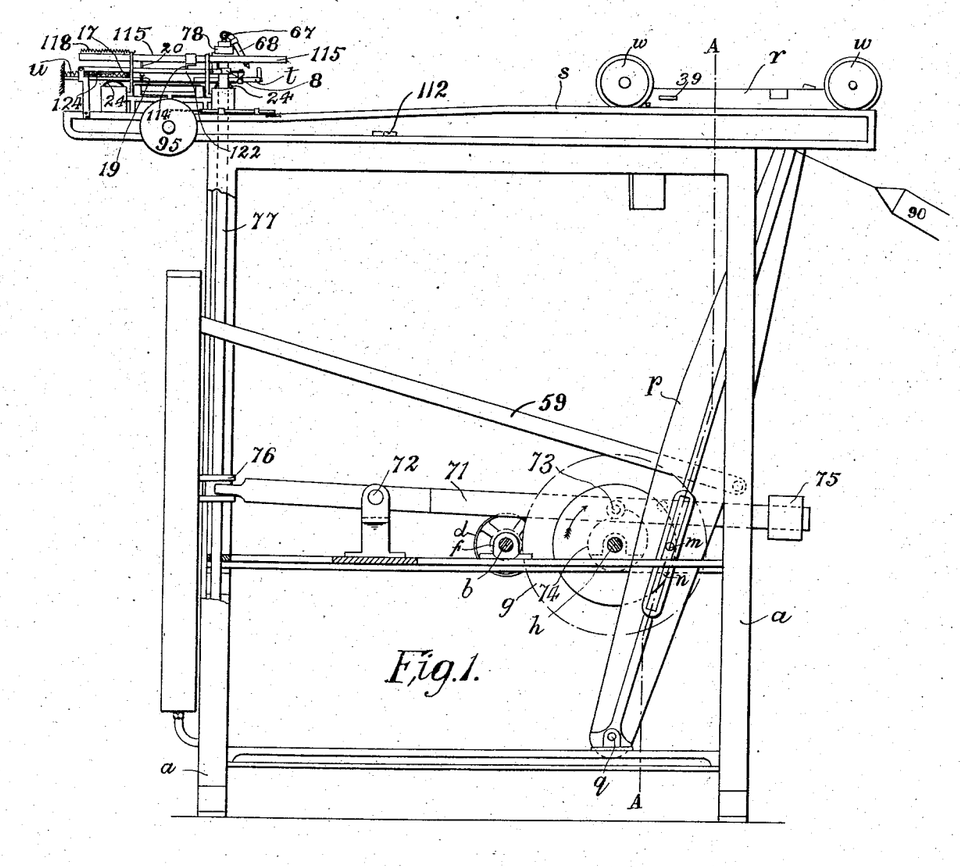
Figure 1 is a side elevation of the machine.
Figure 2:
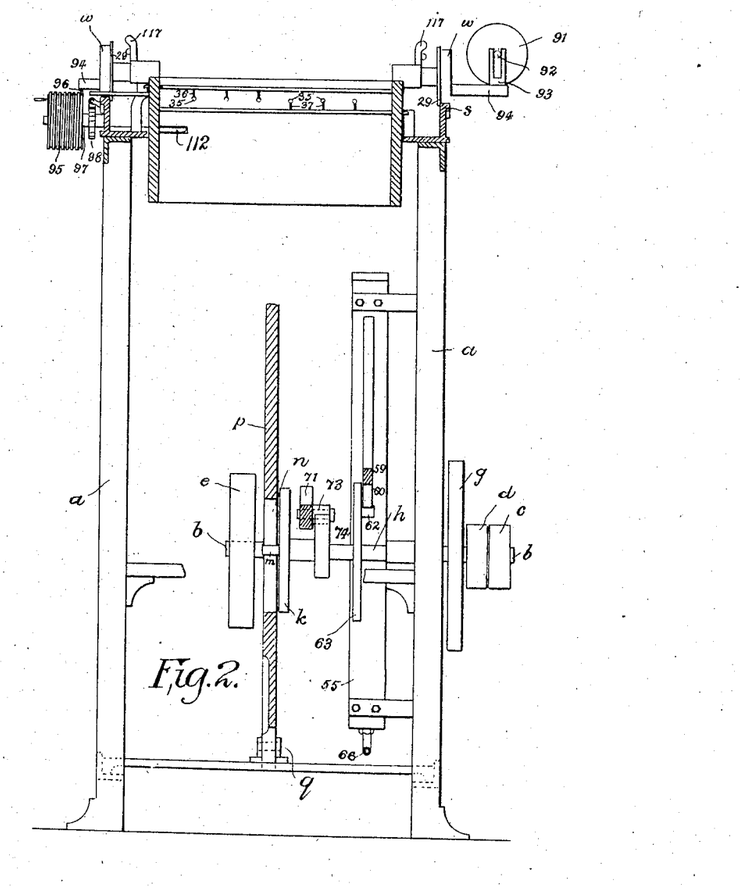
Fig. 2 is a vertical section on the line A A of Fig. 1.

Referring in the first place to Figs. 1 and 2, $a$ is the frame of the machine, on which is supported in suitable bearings the driving-shaft $b$, carrying the fast and loose pulleys $c$ $d$ and fly-wheel $e$. This driving-shaft also carries a pinion $f$, which gears with a spur-wheel $g$, carried by the cam-shaft $h$. This cam-shaft is provided with a disk $k$, which carries a pin $m$, which works in a slot $n$, cut in the lever $p$. This lever is pivoted at $q$ to the frame of the machine and is caused by the pin $m$, which rotates in the direction shown by the arrow in Fig. 1, to make a slow backward movement and a relatively quick return. The top end of the lever acts to reciprocate the carriage $r$. This carriage is provided with four wheels $w$, which run on rails $s$, attached to or forming part of the frame of the machine. It is during the slow movement of the carriage from the front to the back of the machine that the yarn is broken. The fixed grips $t$ (see Fig. 1) are mounted in the front of the machine at about the level of the carriage. The springs for returning these grips to their normal positions after they have been displaced by the tension on the yarn can be seen at $u$. One of these grips, with the plate on which it is mounted, is shown in plan and elevation in Figs. 3 and 4. Fig. 5 is an inverted plan of the end of the grip. Fig. 6 is an end view of the grip, and Fig. 7 is a section on the line X X of Fig. 4. The grip has two jaws $x$ $x$, each of which may carry at its rearward end a vertical rod or projection $y$, the object of which is to prevent the broken end of yarn from becoming entangled when it rebounds at the moment of fracture. The jaws are pressed together by blade-springs $z$ $z$, which are held in place and pressed inward toward each other by means of a screw-pin 2 and nut 3. The jaws are supported on a plate 4, which is attached at its front end to a plate 5, (or the plates 4 and 5 may be made in one piece.) The plate 4 also carries a spring-plate 6, supported at 7 and carrying at its back end two downwardly-projecting pieces 8. These pieces have inclined surfaces 9, which engage with inclined surfaces 10 on the upwardly-projecting ends of a cross-piece 11. This cross-piece is fixed to the pin 12, which passes upward between the jaws and passes through a hole cut for it in the spring-plate 6. When this spring-plate 6 is depressed, the inclined surfaces 9 act on the inclined surfaces 10, so as to give an angular movement in a horizontal plane to the cross-piece 11, and therefore to give a partial rotation to the pin 12. This pin 12 is cut away at the sides, so as to produce a flattened part 13. (See Fig. 7.) This portion occupies the slot 14, (see Fig. 3,) cut between the jaws. The width of the flat portion 13 of the pin is slightly less than the width of this slot 14, so that when a partial rotation is given to the pin 12 the jaws will be forced apart against the action of the blade-springs $z$. This forcing apart of the jaws is necessary to enable the waste end of yarn to be released and a new portion of yarn to be caught.

The means for applying pressure to the plate-spring 6 in order to force open the jaws will now be explained. A lever 71 (see Fig. 1) is pivoted to the frame of the machine at 72 and carries a bowl 73, Figs. 1 and 2, which is actuated by a cam 74, fixed on the shaft $h$. The lever is shown in plan in Fig. 20. It carries a weight 75 at one end, while the other forked ends are each adapted to engage with a collar 76. These collars are arranged on vertical shafts 77, which pass upward one at each side of the machine, as shown in Fig. 1, and are connected at their top ends to a bar 78, which extends across the machine above the fixed grips. This cross-bar 78 is provided with a number of studs 79, (see Figs. 10 and 11,) one of which is situated over the spring-plate 6 of each fixed grip. When the lever 71 has its rear end raised by the cam and its forward end consequently depressed, it will be clear that the studs 79 will press down on the spring-plates of the fixed grips and open these grips in the manner which has already been described.

Figure 3:
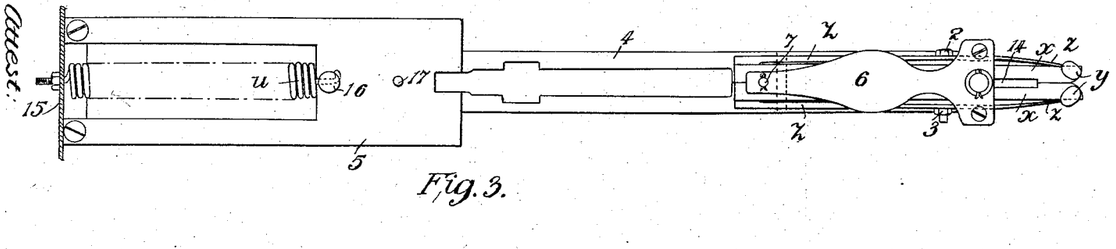
Figs. 3 to 7 are detail drawings of one of the fixed grips and will be more particularly referred to hereinafter.
Figures 4, 5, 6, 7, 8, 9:
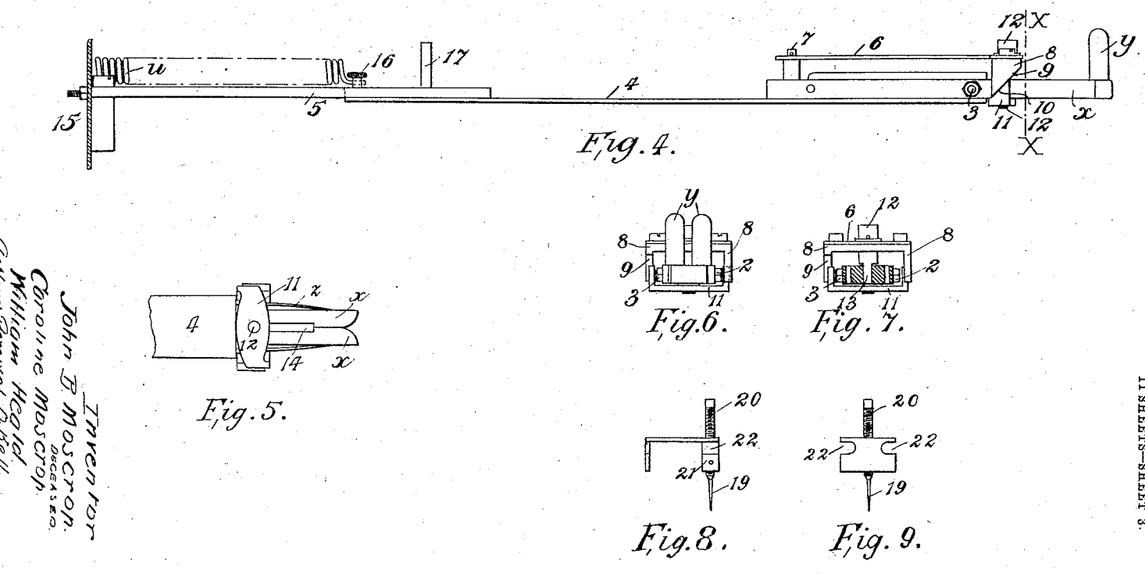
Figs. 8 and 9 are detail views of one of the needle-carriers.
Figure 10:
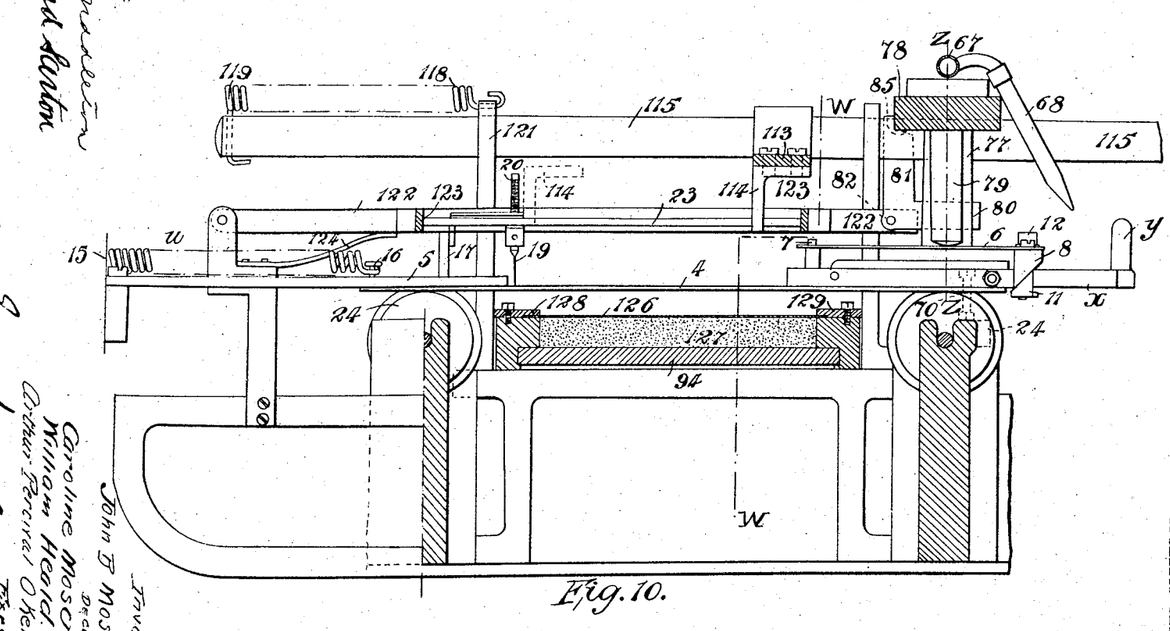
Fig. 10 shows in vertical section the top front part of the machine with the fixed grips, recording-needles, and mechanism connected therewith. The section is on the line Y Y of Fig. 11.
Figure 11:
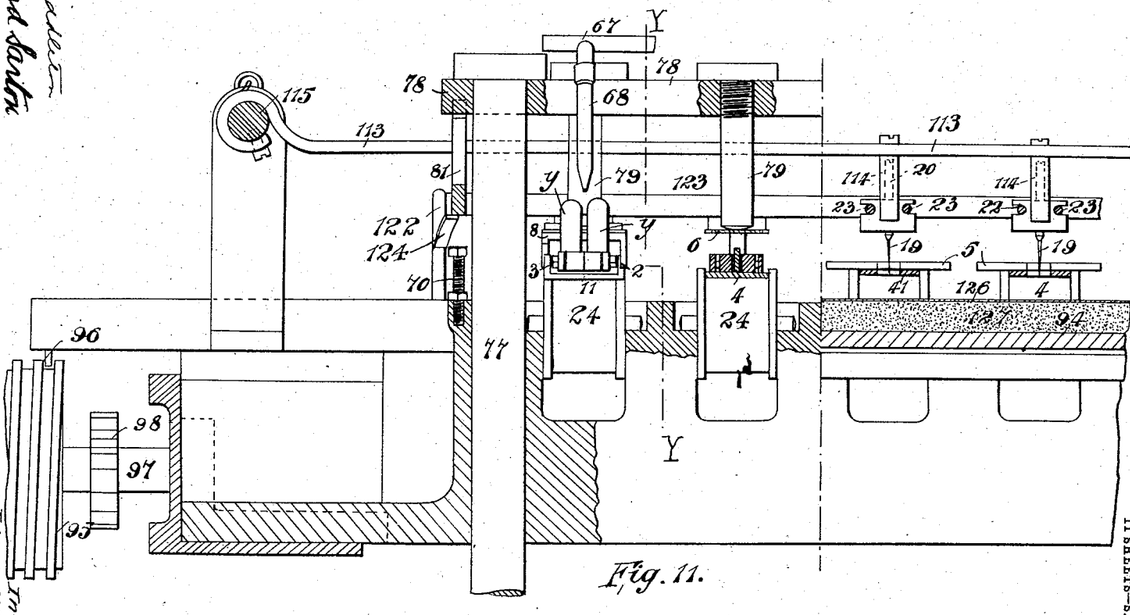
Fig. 11 shows two sections of the same part of the machine, the left-hand portion being a section on the line Z Z of Fig. 10, (with, however, one grip and nozzle in elevation and not in section,) and the right-hand portion being a section on the line W W of Fig. 10.

A vertical pin 17 can be seen in Figs. 3, 4, and 10 projecting upward from the plate 5. This pin is for pushing back the needle-carrier, which holds the needle which makes the record of the tension at which the yarn breaks. This needle, with its carrier, is shown in Figs. 8 and 9 in side elevation and back elevation, respectively. The needle 19 is adjustably secured by the screw 20 to the carrier 21. This carrier is provided with slots 22, by which it is supported on bars on which it can move backward and forward. These bars are shown marked 23 in Fig. 10 and in Fig. 11. The plates 4 and 5 of the grip run on rollers 24. (See Figs. 10 and 11.) The needle-carrier is supported over the plate 4, as shown in Figs. 10 and 11, and when the grip moves backward, due to tension being put on the yarn, the needle-carrier is pushed backward also by the vertical pin 17. When the yarn breaks, the grip is drawn back to its normal position by a spring which has been put in tension during the backward movement of the grip. This spring $u$ is shown in Figs. 1, 3, 4, 10, and 18. One end of this spring is fixed to the plate 15, forming part of the frame of the machine, while the other end is held by the pin 16 to the plate 5. As this spring requires a greater force to elongate it a greater distance than a smaller distance, the displacement of the grip is therefore a measure of the tension on the yarn when it breaks.

The cross-bar 78 has another use besides that (already described) of opening the fixed grips. It presses down on the upper arms of two bell-crank levers 81, Figs. 10 and 11, which are pivoted at 82 to bars 122, which carry cross-bars 123, which in turn carry the rods 23, on which slide the needle-carriers. The depression of the cross-bar 78 therefore forces the needles downward and causes them to prick records in a band of paper placed below them. (This paper will be referred to hereinafter.) The upper portion of each bell-crank lever 81 on which the cross-bar 78 acts has a recess having a sloping lower surface 85. When the rods 23 have been depressed by the action of the cross-bar on the bell-crank levers sufficiently to allow the needles 19 to make a record on the band of paper, the end 80 of each bell-crank lever strikes a pin 70 and is arrested. The bar 78 consequently slips over the sloping surface 85, and the bell-crank levers, bars, rods, and needles return to their normal positions by the action of blade-springs 124, which act on the bars 122. The bar 78, however, completes its descent, and then when allowed by the cam 74 it rises quickly under the action of the weight 75 on the rear end of the lever 71. This trip action is provided to allow the needles to rise quickly, so that they can be returned to their normal positions preparatory to another cycle of movements. The needle-carriers are returned to their front positions by means of a cross-bar 113, (see Fig. 11,) to which are attached downwardly-projecting pieces 114, Figs. 10 and 11. These pieces 114 are arranged one behind each needle-carrier and are adapted to push forward the needle-carriers when the bar 113 is pushed forward. One of the pieces 114 is shown in dotted lines in Fig. 10 in the position it occupies when it has pushed forward the needle-carrier. The cross-bar 113 is attached at its ends to two rods 115. When the carriage moves forward, lugs 117, (see Fig. 14,) attached to the carriage, strike the ends of the rods 115 and push these rods forward. The relative positions of the lugs 117 and the rods 115 can be seen in Fig. 18. When the rods 115 are moved forward, they take with them the cross-bar 113 and the pieces 114. The needle-carriers are thus carried forward. When the carriage moves back again, the springs 118 return the rods 115 to their normal positions; but the needle-carriers remain deposited in their forward positions. The springs 118 have each one end 119 (see Fig. 10) attached to the end of the corresponding rod 115, while the other end of the spring is anchored to a bar 121, forming part of the frame of the machine. The springs 118 can be seen in plan in Fig. 18. They act in tension.

Figure 12:
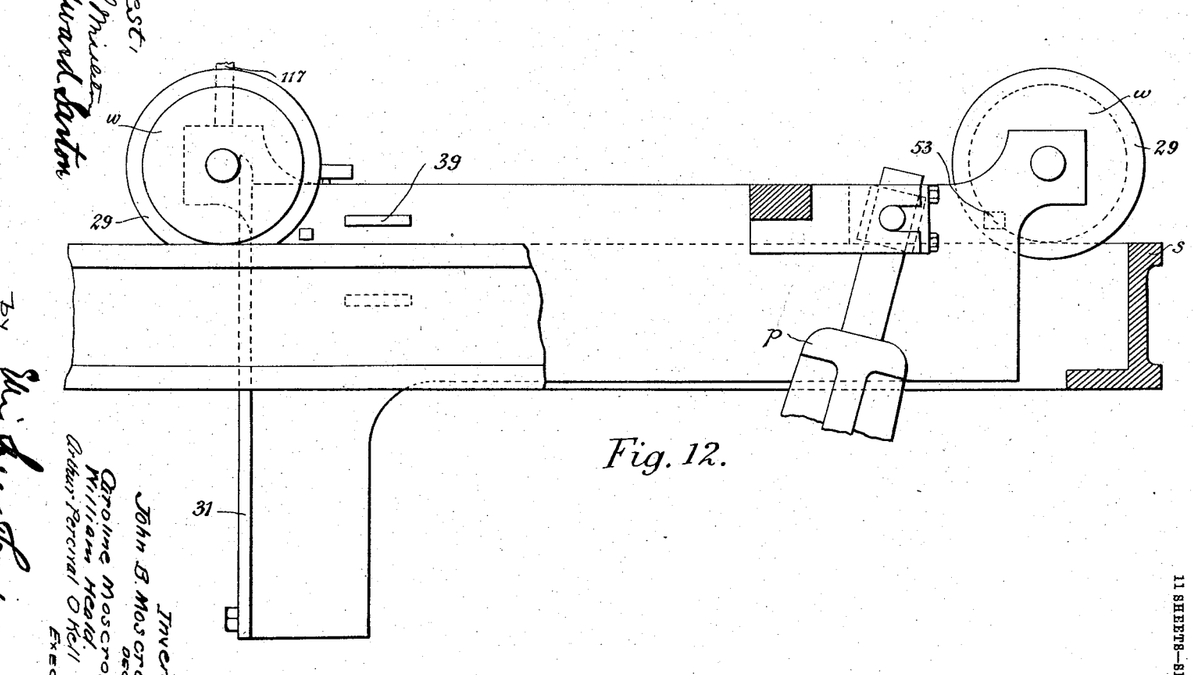
Fig. 12 is a side elevation of the traveling carriage.
Figure 13:
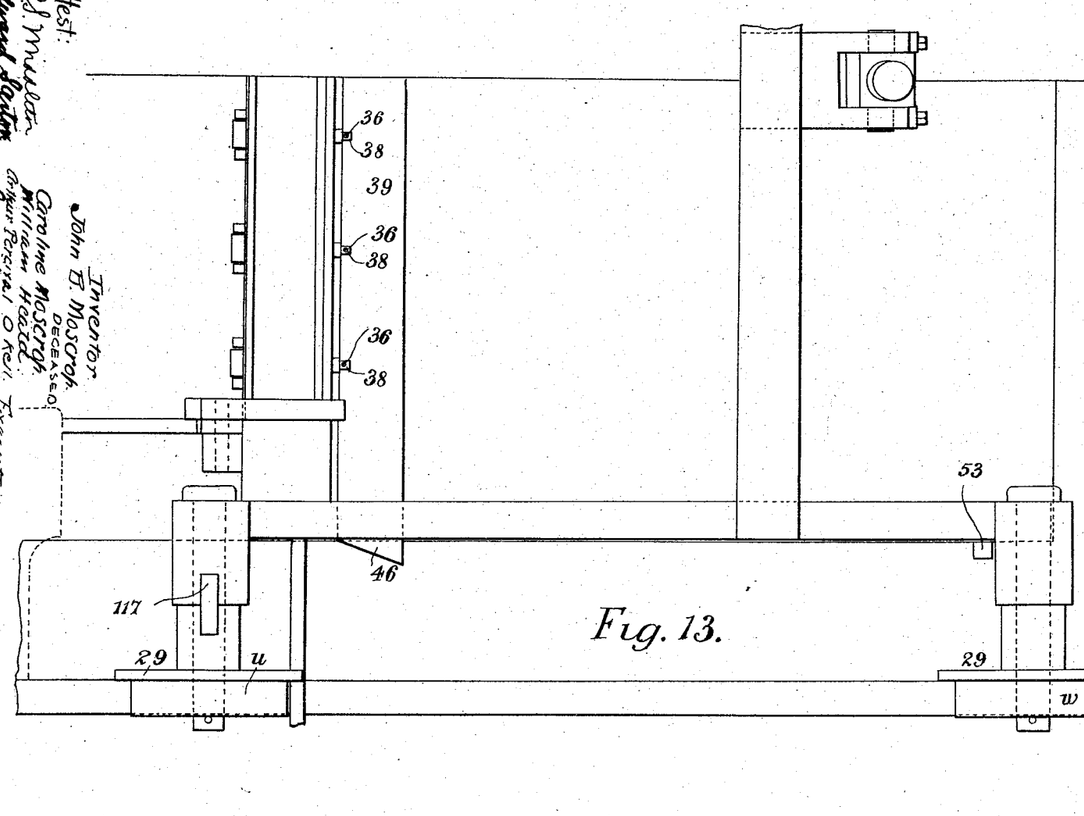
Fig. 13 is a half-plan of the same.
Figure 14:
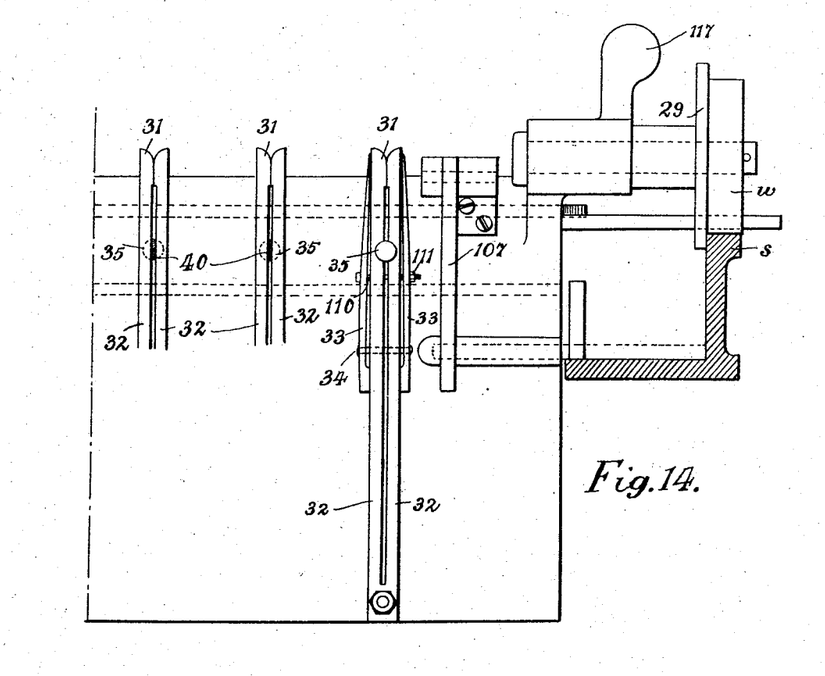
Fig. 14 is a half front elevation of the same.
Figures 15, 19, 20:
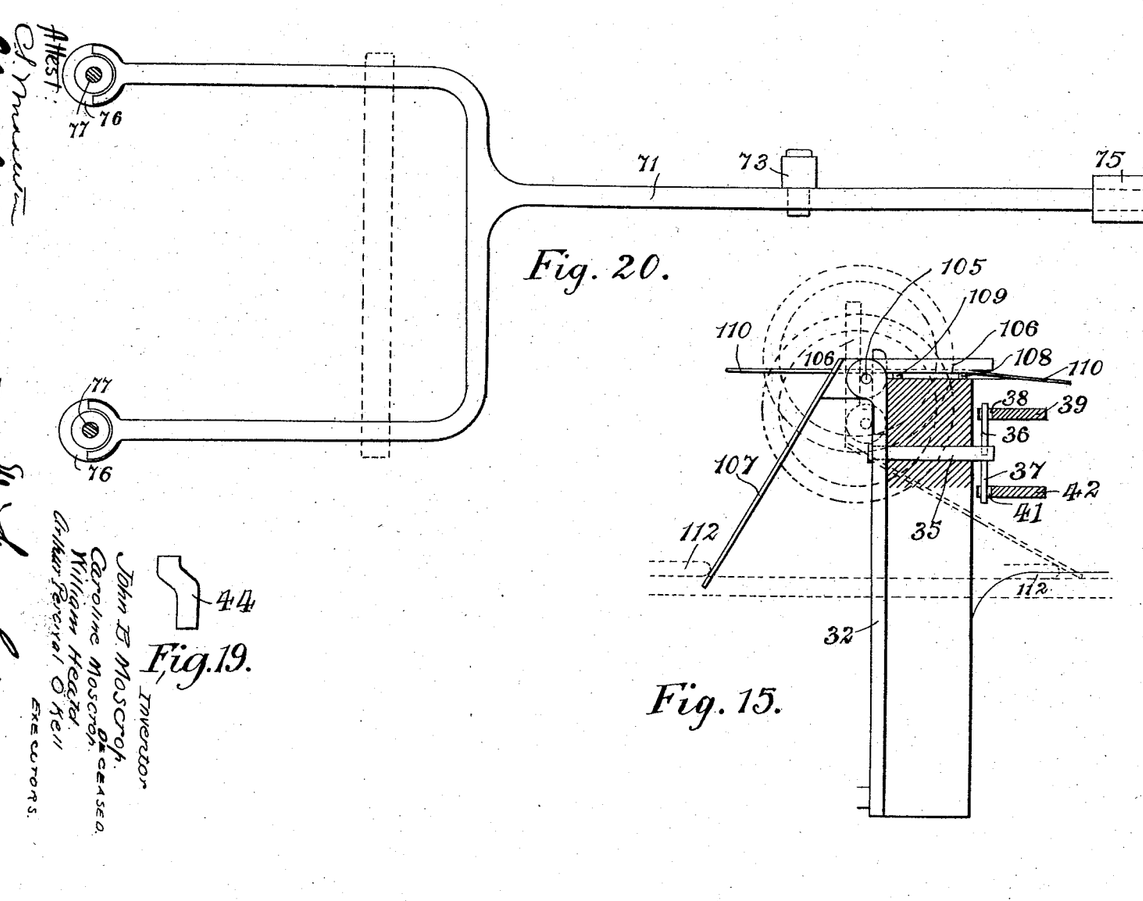
Fig. 15 is a vertical section of the same.
Fig. 19 is a detail view of one of the lugs for releasing one of the grip-opening bars on the carriage.
Fig. 20 is a plan of the lever for opening the fixed grips and pressing down the needles.
Figures 16, 17:
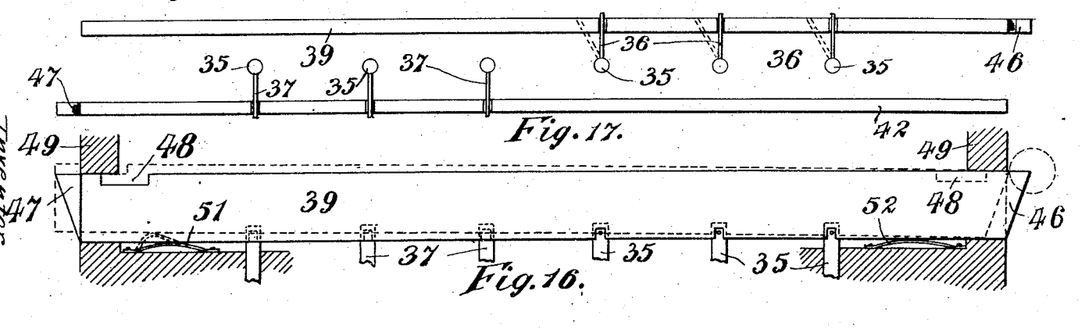
Fig. 16 is a plan of the mechanism for opening the grips on the carriage.
Fig. 17 shows part of the same in front elevation.

The record is preferably made on a sheet of paper which is stretched across the front end of the machine below the needles. The paper is preferably supplied in the form of a roll 91, Fig. 2. The metal or other center of the roll 92 is placed at each end of the roll between the prongs of a forked bar 93, which is mounted on a table 94. This table can also be seen in Figs. 10 and 11, the roll not being shown in these views. The strip of paper 126 is stretched across the top of a groove 127 in the table, the space below the paper being filled in with felt. The strip of paper is held down at both sides by means of cover-plates 128 129. The table is moved along the front of the machine by means of a worm 95, which engages with a tooth 96, carried by the end of the table remote from that holding the roller. (See Figs. 2 and 11.) The worm 95 is mounted on a shaft 97, which also carries a ratchet-wheel 98. This ratchet-wheel is rotated one or more teeth at a time by means of a pawl 99, Fig. 18, pivoted to a rod 100, which is supported in guides 101 101, fixed to the frame of the machine. A projection 102, carried by the carriage, engages with the end of this rod 100 when the carriage is near the end of its forward journey. The remainder of the forward journey of the carriage will move the rod 100 so as to cause the pawl 99 to turn the ratchet-wheel 98 one or more teeth. When the carriage makes its return journey, the spring 103 returns the rod 100 to its normal position. The pivotal connection of the carriage to its actuating-lever $p$ is shown in Figs. 12 and 13. The wheels $w$ have, preferably, flanges 29 to prevent the wheels running off the rails. The carriage is provided with grips 31, which are the same in number as the fixed grips already described. Three of these grips are seen in Fig. 14, which is a front elevation of part of the carriage. Each of these grips has two jaws 32, which are very much the same as the jaws of the fixed grips already described. The jaws are pressed together by means of blade-springs 33, which are held in by the pin 34 and also by the screwed pin 110 and nut 111. The tension of the blade-springs can be adjusted by the nut 111. Pins 35 are provided, having flattened portions 40, which flattened portions pass between the jaws of the grips. When these pins 35 are given a partial rotation, it will be obvious that the grips will be pressed apart in the manner described with reference to the fixed grips. The mechanism for giving this angular motion to the pin 35 is best seen in Figs. 13 and 15. Half of the pins 35 are provided with upwardly-projecting studs 36 and the other half of the pins 35 with downwardly-projecting studs 37. The studs 36, as shown in Figs. 13 and 15, enter slots 38 in the bar 39, which extends across the machine. The studs 37 enter similar slots 41 in a similar bar 42, which also extends across the machine. The bars 39 and 42 are given motions across the machine at the desired instants, so as to open the grips at the right moments. The mechanism for doing this will be described hereinafter. When the bars are released, the blade-springs 33 of the grips close these grips and return the bars and other mechanism to their normal positions. The bars 39 and 42 are actuated to open the moving grips, respectively, by the lugs 44 and 45. (See Fig. 18.) Of these the lug 44 is bent, as shown in Fig. 19, so as to clear the lower bar 42. The bar 39 is formed with an inclined end 46 and the bar 42 with an inclined end 47. When the carriage moves forward, the inclined end 46 of the bar 39 engages with the lug 44 and the inclined end 47 of the bar 42 engages with the lug 45, so that the bars are given each a small movement across the machine, the motions being in opposite directions. These motions open the moving grips in the manner which has already been described. When the bars have been displaced, grooves or holes 48, cut in the forward ends of the bars, as shown in Fig. 16, engage with catches 49, so that the bars are kept from returning to their normal positions. The springs 51 52 act to hold the holes 48 in engagement with the catches 49 and prevent the displacement of the bars owing to any vibration. The upper bar is shown in its displaced position by dotted lines in Fig. 16, and the spring 51 is shown in its corresponding position by dotted lines. The bars are released and the moving grips allowed to close when the carriage has reached a certain point on its rearward journey. Lugs 53 (see Figs. 12 and 13) are provided for this purpose. The ends of the bars 39 42 strike these lugs 53, and the bars are knocked out of engagement with the catches 49. The bars are then returned to their normal positions by the action of the blade-springs on the moving grips.

In order to free the fixed grips from the loose ends of yarn which are left in them after the yarn has been broken, an air-pump is provided, which projects a small blast of air against each fixed grip when this has been opened, so as to blow away the loose ends of yarn. This air-pump is indicated by 55 in Fig. 22. The air-pump piston 56 is provided with a hole or slot 57, into which projects the end 58 of the lever 59. A plate 60 is attached to or formed integral with the lever 59, and this plate engages with a pin 62, which is carried by a disk 63 on the shaft $h$, Figs. 1, 2, and 22. The lever 59 is pivoted at 61 to the frame of the machine, and the plate 60 is so arranged with relation to the movement of the pin 62, which rotates in the direction shown by the arrow in Figs. 1 and 22, that the lever 59 will have a quick descent. The lever 59 passes through a slot 65 in the side of the cylinder 55. The first part of the stroke of the air-pump piston is therefore idle; but when the piston gets to the bottom of the slot 65 it compresses the air in the lower part of the air-pump cylinder. The piston reaches this part of its stroke with considerable momentum, and a current of air is therefore sent smartly along the tube 66 to the pipe 67, which extends across the machine above the fixed grips, as seen in Figs. 10 and 11. This cross-pipe is provided with holes or nozzles, each adapted to allow a jet of air to be projected against the gripping ends of the jaws of one of the fixed grips. Nozzles 68 are shown in the drawings. The puff of air projected against each fixed grip is sufficient when the grip is opened to remove the loose end of yarn, which is blown into a box provided beneath the fixed grips. The box may be of any convenient nature, but is not shown in the drawings, for the sake of clearness.

Figure 18:
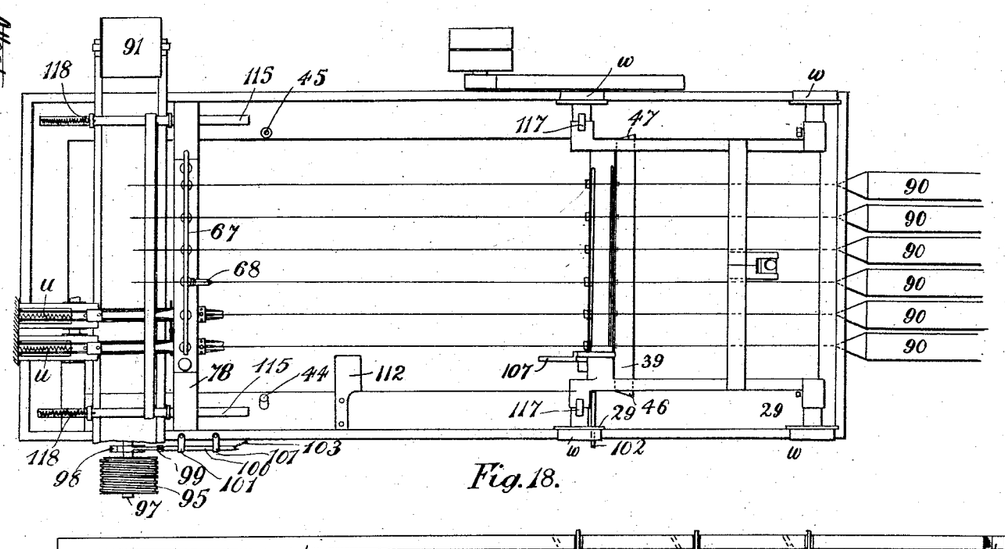
Fig. 18 is a plan of the machine.
Figures 21, 22:
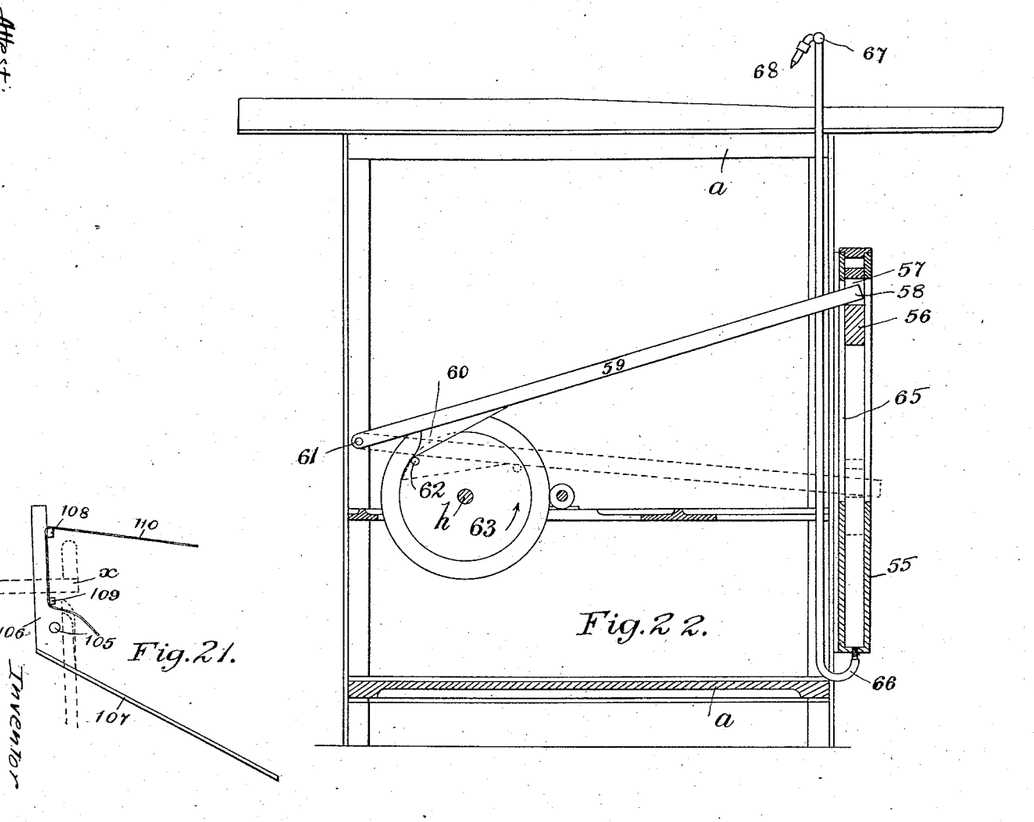
Fig. 21 is illustrative of the method of presenting the yarn to the fixed grips.
Fig. 22 shows the air-pump and actuating mechanism.

Referring now to Figs. 15 and 21, the method of presenting the yarn to the fixed grips is here illustrated. On the front of the machine-carriage is pivoted at 105 a lever or levers 106 107. These levers carry two bars 108 109. These bars are normally situated in the same horizontal plane as shown in Fig. 15, and the yarn 110 passes over them after leaving the cops. These cops 90 are shown in Figs. 1 and 18. When the carriage is making its forward journey and approaches the fixed grips, the lower end 107 of each lever strikes the projection 112 on the frame of the machine and the lever is tilted over, and at the same time the position of the carriage is lowered, owing to the inclination of the rails, as shown in Fig. 1. The amount of drop of the carriage is shown in Fig. 15 by circles being drawn in dotted lines illustrating the position of the front wheels of the carriage when the latter has arrived at the forward end of its journey, and the position these wheels would have occupied if the carriage had not been dropped. The combined vertical and angular displacement given to the levers 106 107 brings them into the position shown in dotted lines in Fig. 15 and in full lines in Fig. 21. The length of yarn between the bars 108 109 now passes between the jaws of the fixed grips, which jaws are shown by dotted lines in Fig. 21 and lettered $x$. It is when the yarn is in this position that the fixed grips are closed. When the carriage moves back again, the levers 106 107 fall back again to their normal positions. The weights of the levers are so arranged with respect to the pivot-point 105 as to insure that this will take place.

The operation of the machine is as follows: Suppose that the carriage is at the end of its backward journey—that is, the fixed and moving grips are at their farthest distance apart. The carriage now commences to move forward. While the carriage is moving forward the cam 74 is lifting the bowl 73, and thus depressing the forward end of the lever 71. This is consequently lowering the rods 77 and also the cross-bar 78. This bar depresses the studs 79 down on the spring-plates 6, and consequently opens the fixed grips. At the same time the needles are forced downward, make their records on the band of paper, and spring up again. The piston of the air-pump now descends, and a puff of air is emitted from each hole or nozzle, which puff blows away the loose end of yarn from each fixed grip. The lugs 117 now strike the ends of the bars 115 and push forward the needle-carriers to the front positions. While this is taking place the lugs 44 45 are struck by the inclined ends 46 and 47 of the bars 39 and 42 and the moving grips are opened. About the same time the levers 107 strike the projections 112 and the bars 108 109 are elevated, so as to stretch the yarn vertically, and thus pass it between the jaws of the fixed grips. While this is taking place the projection 102 on the carriage is pressing on the end of the rod 100 and is forcing the pawl 99 to turn the ratchet-wheel, and thus feed forward the paper. The quick drop of the cam 74 now allows the fixed grips to close on the yarn, and the carriage then commences to retire. The levers 107, with the bars 108 109, fall back to their normal positions and allow the yarn stretched between the fixed grips and the bar 108 to pass between the jaws of the moving grips. The bars 39 and 42 are now released by striking the lugs 53, and the moving grips therefore close on the yarn. The continued backward travel of the carriage now puts tension on the yarn, the fixed grips are pulled back, and the springs $u$ elongated until the separate pieces of yarn break. The springs $u$ now pull back the fixed grips to their normal positions, leaving the needles in position to be pressed down into the paper when the carriage next comes forward. The cycle is completed by the carriage reaching the end of its rearward journey.

Having now described this invention, what is claimed as new, and desired to be secured by Letters Patent, is—

1. In machines for testing and recording the strength of yarn, in combination, a traveling carriage, a grip carried by the frame of the machine and adapted to take hold of a single piece of yarn and to be displaced when tension is put on this yarn, a grip borne by said carriage and adapted to take hold of the same piece of yarn and put tension on it during the backward movement of the carriage, and a marker adapted to make a record of the maximum displacement of the first-mentioned grip during each cycle of operations, and means for receiving and retaining the record, substantially as and for the purpose described.

2. In machines for testing and recording the strength of yarn, in combination, a traveling carriage, a grip carried by the frame of the machine and adapted to take hold of a single piece of yarn and to be displaced when tension is put on this yarn, a spring adapted to resist this displacement, a grip borne by said carriage and adapted to take hold of the same piece of yarn and put tension on it during the backward movement of the carriage, and a marker adapted to make a record of the maximum displacement of the first-mentioned grip during each cycle of operations, and means for receiving and retaining the record, substantially as and for the purpose described.

3. In machines for testing and recording the strength of yarn, in combination, grips $t$ and 31 adapted to hold between them a single piece of yarn, means for causing the grip 31 to recede from the grip $t$ till tension is put on the yarn and increased till it breaks, a spring for acting on the grip $t$ against the tension of the yarn, a strip of paper and a marker adapted to make a record on said strip of paper of the displacement of the grip $t$ against the action of the said spring, substantially as and for the purpose described.

4. In machines for testing the strength of yarn, the combination of a carriage which bears a plurality of grips with means for reciprocating the said carriage and means for positively opening the grips at a certain point in the stroke of the carriage and retaining and releasing devices for the said opening means, substantially as described.

5. In machines for testing the strength of yarn, in combination, a grip having two jaws, springs adapted to press together the said jaws and a pin having a flattened portion situated between the said jaws and adapted by a partial rotation to force apart the said jaws, substantially as described.

6. In machines for testing the strength of yarn, in combination, a grip $t$ having two jaws $x$, springs $z$ adapted to press together the said jaws and a pin having a flattened portion situated between the said jaws and adapted by a partial rotation to force apart the said jaws, substantially as described and as illustrated in the accompanying drawings.

7. In machines for testing the strength of yarn, in combination, a grip having two jaws, springs adapted to press together the said jaws, a pin having a flattened portion situated between the said jaws and adapted by a partial rotation to force apart the said jaws, a cross-piece formed rigid with the said pin and a plate furnished with two projections which are adapted to engage obliquely with projections carried by the said cross-piece, substantially as and for the purpose described.

8. In machines for testing the strength of yarn, in combination, a grip 31 having two jaws 32, springs 33 adapted to press together said jaws and a pin having a flattened portion situated between the said jaws and adapted by a partial rotation to force apart said jaws, substantially as described and as illustrated in the accompanying drawings.

9. In machines for testing the strength of yarn, in combination, a grip having two jaws, springs adapted to press together the said jaws, a pin having a flattened portion situated between the said jaws and adapted by a partial rotation to force apart the said jaws, a stud carried by said pin and a bar adapted to reciprocate across the machine and to engage with said stud, substantially as and for the purpose described.

10. In machines for testing the strength of yarn, in combination, a grip having two jaws, springs adapted to press together the said jaws, a pin having a flattened portion situated between the said jaws and adapted by a partial rotation to force apart the said jaws, an air-pump and a pipe fed by said air-pump and adapted to allow a jet of air to be projected onto said jaws, substantially as described.

In witness whereof we have hereunto set our hands in the presence of two witnesses.

CAROLINE MOSCROP,
WM. HEALD,
ARTHUR PERCIVAL OKELL,
*Executors of the last will and testament of John Brown Moscrop, deceased.*

Witnesses:
ROBERT MORRISON NEILSON,
JAMES SMITH.